(12) United States Patent
He et al.

(10) Patent No.: US 7,728,746 B2
(45) Date of Patent: Jun. 1, 2010

(54) SIGNAL TRANSITION FEATURE BASED CODING FOR SERIAL LINK

(75) Inventors: Xiaoying He, Beijing (CN); Luhong Liang, Beijing (CN); Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 10/577,677

(22) PCT Filed: Nov. 22, 2005

(86) PCT No.: PCT/CN2005/001975
§ 371 (c)(1),
(2), (4) Date: Sep. 3, 2008

(87) PCT Pub. No.: WO2007/059645
PCT Pub. Date: May 31, 2007

(65) Prior Publication Data
US 2009/0010261 A1    Jan. 8, 2009

(51) Int. Cl.
*H03M 9/00* (2006.01)
(52) U.S. Cl. .................................. 341/101; 341/50
(58) Field of Classification Search .............. 341/50, 341/100, 101
See application file for complete search history.

(56) References Cited

U.S. PATENT DOCUMENTS

| | | | |
|---|---|---|---|
| 5,345,563 | A | 9/1994 | Uihlein et al. |
| 6,034,879 | A * | 3/2000 | Min et al. ............... 365/63 |
| 6,583,735 | B2 * | 6/2003 | Henkel et al. ............ 341/51 |
| 6,665,754 | B2 | 12/2003 | Mann |
| 6,943,706 | B2 * | 9/2005 | Pappalardo et al. ....... 341/50 |
| 2003/0158732 | A1 | 8/2003 | Pi |
| 2004/0122675 | A1 | 6/2004 | Nefian |
| 2004/0153927 | A1 * | 8/2004 | Pappalardo et al. ..... 714/735 |
| 2005/0015251 | A1 | 1/2005 | Pi et al. |
| 2007/0226387 | A1 * | 9/2007 | Croxford ................ 710/66 |

(Continued)

FOREIGN PATENT DOCUMENTS

CN    1509440 A    6/2004

(Continued)

OTHER PUBLICATIONS

Stan et al.; Low Power Encodings for Global Communications in CMOS VLSI; IEEE Transactions of Very Large Scale Integration Systems, (VLSI); IEEE Dec. 1997, vol. 5, No. 4, pp. 444-455.*

(Continued)

*Primary Examiner*—Howard Williams
(74) *Attorney, Agent, or Firm*—Blakely, Sokoloff, Taylor & Zafman LLP (57) ABSTRACT

Signal transition feature based coding for serial link is described herein. According to one embodiment, in response to a data stream transmitted onto a serial communication link, one or more bits of the data stream are encoded according to bit order determined based on a frequency of signal transitions of the data stream. As a result, a sequence of encoded data stream having a lower number of bit transitions with respect to the frequency of signal transitions of the data stream prior to the encoding is generated. Thereafter, the encoded data sequence is transmitted onto the serial communication link. Other methods and apparatuses are also described.

20 Claims, 8 Drawing Sheets

U.S. PATENT DOCUMENTS

2007/0290902 A1* 12/2007 Bae et al. ..................... 341/101
2008/0001793 A1* 1/2008 Ghoneima et al. .......... 341/100

FOREIGN PATENT DOCUMENTS

EP 0 499 890 A2 8/1992
EP 0 686 920 A2 12/1995

OTHER PUBLICATIONS

Lyuh et al.; Low Power Bus Encoding with CrossTalk Delay Elimination; 15th Annual IEEE International Conference on ASIC/SOC; Sep. 2002; pp. 389-393.*

Lee, Kangmin et al.; Silent: Serialized Low Energy Transmission Coding for On-Chip Interconnection Networks; IEEE/ACM International Conference on Computer Aided Design, 2004. ICCAD-2004. Nov. 2004, pp. 448-451.*

Ghonemia et al., Reducing the Data Switching Activity on Serial Link Buses; 7th International Symposium on Quality Electronic Design, 2006. ISQED '06; Mar. 27-29, 2006, pp. 6-432.*

PCT International Search Report and Written Opinion, PCT/CN2005/001975, Int'l Filing date Nov. 22, 2005, Mailed Jun. 15, 2006 (8 pages).

* cited by examiner

SIGNAL TRANSITION FEATURE BASED CODING FOR SERIAL LINK

CROSS-REFERENCE TO RELATED APPLICATION

This application is a National Phase application of, and claims priority to, International Application No. PCT/CN2005/001975, filed Nov. 22, 2005, entitled "SIGNAL TRANSITION FEATURE BASED CODING FOR SERIAL LINK".

FIELD

Embodiments of the invention relate to data processing systems; and more specifically, to signal transition feature based coding for serial link.

BACKGROUND

For circuits optimized for low-power, the power dissipated at the I/O (input/output circuit) is typically around 50% of the total power consumption. This I/O power dissipation is a consequence of relatively large dimensions of devices in the I/O pads and of the external-capacitances due to I/O pins, wires, and connected circuits. The devices in the I/O need to be large in order to drive the large external capacitances and this further increases their own parasitic capacitances. The capacitances on printed circuit boards are about two orders of magnitude larger than that inside of a chip. Dynamic charging and discharging these capacitances causes I/O pins to consume a relatively large amount of power.

Coding the I/O for lower power consumption has been utilized recently. Coding I/O for low power is practical and has been implemented in commercial chips. However, most of the conventional approaches are designed for parallel buses.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

Signal transition feature based coding for serial link is described herein. In the following description, numerous details are set forth to provide a more thorough explanation for embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, in one embodiment, a low power coding technique for serial links is utilized. An example of a serial link is an audio link popularly used in a variety of data processing systems. By using this coding technique, in certain configurations, approximately 12.5% of the link power consumption may be reduced only at the expense of two simple circuits added inside the chip, whose power consumption may be neglected.

Throughout this application, an audio link is utilized as an example of a serial link. However, this technique is not limited to audio links. This technique may be applied to other serial links suitable to applying this coding technique to decrease the link power consumption.

In general, the power dissipated in a CMOS (complementary metal oxide semiconductor) circuit can be classified as static power dissipation (e.g., overlap current and DC or direct current static) and dynamic power dissipation. The dynamic power dissipated by a CMOS circuit may be determined as follows:

$$P_{chip} \propto \sum_{i=1}^{N} C_{loadi} \cdot V_{dd}^2 \cdot f \cdot p_{t_i} \qquad (1)$$

Where the sum is calculated over all the N nodes of the circuits; $C_{load_i}$ is the load capacitance at the node i; $V_{dd}$ is the power supply voltage; f is the signal transition frequency; and $p_{t_i}$ is the activity factor at node i. For achieving low-power in circuits one or more of the terms $V_{dd}$, $C_{load_i}$, f, and $p_{t_i}$ may be reduced. It is effective to reduce $p_{t_i}$ in terms of power reduction when the $V_{dd}$ and $C_{load_i}$ are fixed. For a communication link or channel during a specific time interval, an activity factor represents the percentage of time that a signal is present in the channel or link in either direction.

For a low power VLSI (very large-scale integration) design, the focus is on developing low power circuits without affecting too much the performance (area, latency and period). The idea behind embodiments of techniques for decreasing the power dissipation is to code the data according to the signals transition feature, in order to decrease the node's activity factor $p_{t_i}$ on the large capacitance side (I/O) even at the expense of slightly increasing the number of transitions on the low capacitance side (e.g., internal circuits).

Figure 1:
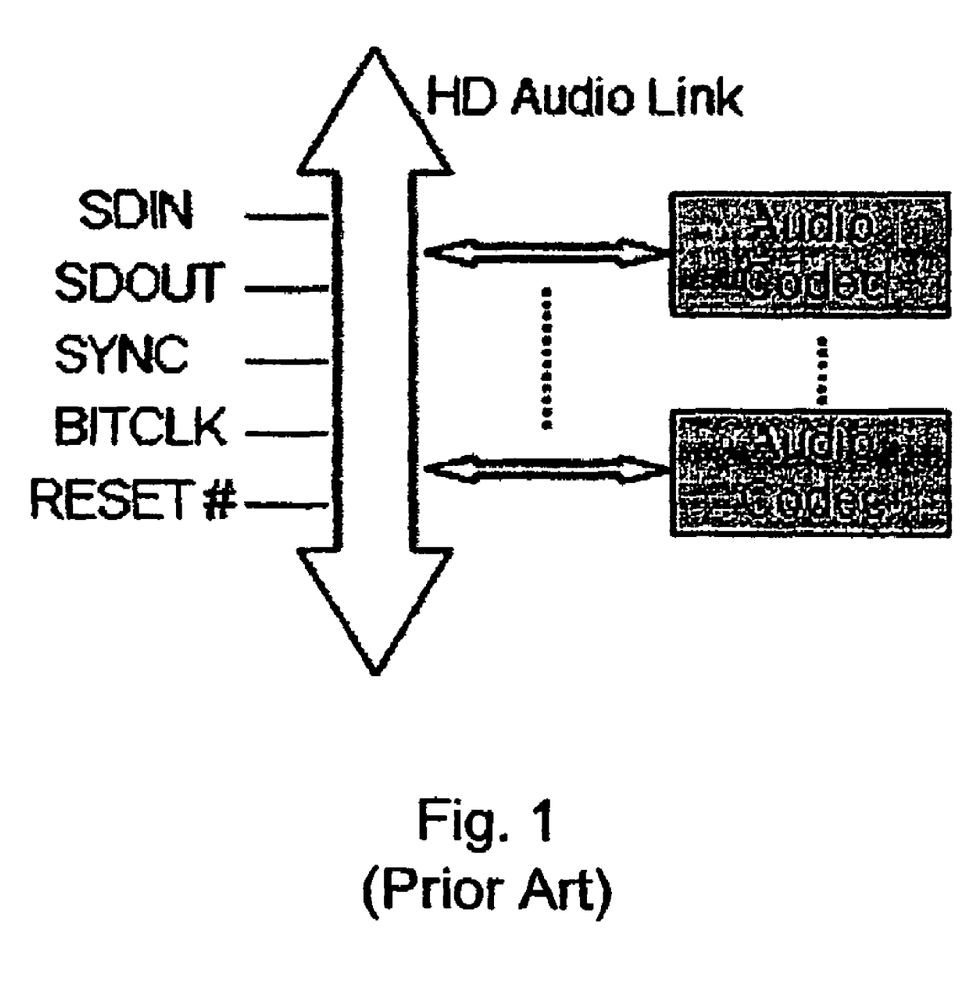
FIG. 1 is an audio link representing a serial link which may be used with an embodiment.

For example, as shown in FIG. 1, the link architecture of high definition (HD) audio is the next generation audio link on data processing systems. HD audio is the serial link between chips (e.g., chipset and audio codec), which has relatively large I/O capacitances resulting in relatively large I/O power dissipation during signal transition due to dynamic capacitances charging and discharging. There are dedicated input and output serial data signals (e.g., SDIN for serial data input and SDOUT for serial data output). Each audio sample (e.g., 8 bits, 16 bits or 24 bits per sample) goes through a parallel-to-serial conversion shifter to be transmitted over a serial link and a serial to parallel conversion shifter at the receiver side.

For audio samples with 8 bit resolution (e.g., range from 0~255), for example, more often, the samples' values are less than half of the peak value 255 (e.g., only unsigned coding are being considered). Similarly, for audio conversation, almost half of the time is quiet phase and the sample's values are even small. This means that the percentage of MSB (most significant bit) of each audio sample being 0 is relatively high (at least about 75%).

Figure 2A:
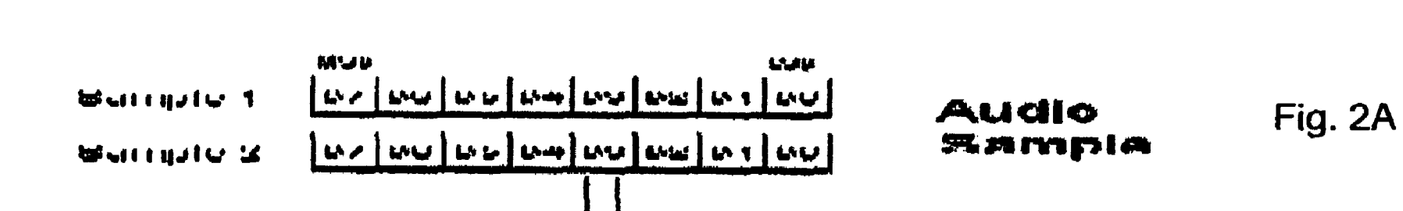
FIGS. 2A-2C are block diagrams illustrating different bit configurations of a data stream according to certain embodiments.

Taking the advantages of shifters for conversion between parallel and serial, as well as the high percentage of MSB of each audio sample being continued 0, according to certain embodiments, the bit's transmission sequence in each sample interlacing as shown in FIG. 2A may reduce the I/O signal activity factor $p_{t_i}$. For normal transmission as shown in FIG. 2B, the data is transmitted by original sequence.

According to certain embodiments of the invention, certain bits of certain segments of a data stream may be coded according to certain orders. The coding orders may be determined based on the activity factors of the segments, where the activity factors may be determined at real-time when the data stream is received. In one embodiment, certain bits of certain segments of the data stream may be coded such that a number of consecutive bits having identical logic values (e.g., logical value 0 or 1) are greater than those of the sequence prior to coding. As a result, a number of transitions (e.g., activity factors) of the data stream may be reduced.

Figures 2B, 2C:
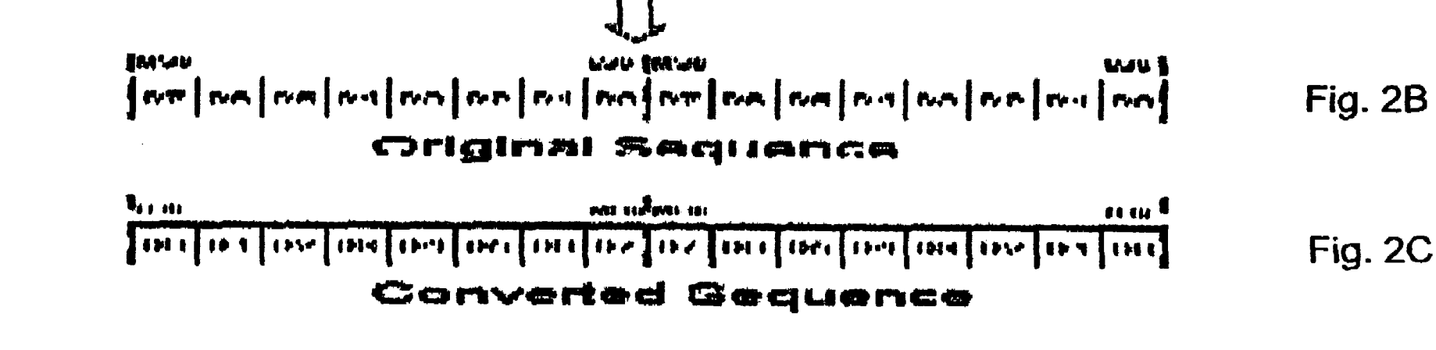

In a particular embodiment, the MSB and LSB's sequence may be converted for a first sample, then normal sequence for a second sample, and then converted, then normal, going on (e.g., every other samples converted) as shown in FIG. 2C. In the converted sequence, according to one embodiment, the MSB of the first sample is coded neighboring to the MSB of the next sample. If their values are same at this time (which is 75% of the case), the signal transitions can be reduced.

For the normal original sequence, as shown in FIG. 2B, MSB is neighboring to LSB. MSB has the probability of 75% being 0 and LSB's value is randomly distributed between 0 and 1. In a particular embodiment, the activity factor (also referred to as a transition factor) between MSB and LSB can be calculated as shown in Table 1 as follows.

TABLE 1

| Distribution of MSB | Distribution of LSB | Probability of no signal transition | Probability of signal transition |
|---|---|---|---|
| 1 (25%) 0 (75%) | 1 (50%) 0 (50%) | $\frac{1}{4} \times \frac{1}{2} + \frac{3}{4} \times \frac{1}{2} = \frac{1}{2}$ | $\frac{1}{4} \times \frac{1}{2} + \frac{3}{4} \times \frac{1}{2} = \frac{1}{2}$ |

For the converted sequence, MSB is neighboring to next sample's MSB once of two borders between samples. MSB has the probability of 75% being 0 and LSB's value is randomly distributed between 0 and 1. The activity factors between two MSBs and two LSBs can be calculated as shown in Table 2 as follows.

TABLE 2

| Distribution of MSB | Distribution of MSB | Probability of no signal transition | Probability of signal transition |
|---|---|---|---|
| 1 (25%) 0 (75%) | 1 (25%) 0 (75%) | $\frac{1}{4} \times \frac{1}{4} + \frac{3}{4} \times \frac{3}{4} = \frac{5}{8}$ | $\frac{1}{4} \times \frac{3}{4} + \frac{3}{4} \times \frac{1}{4} = \frac{3}{8}$ |
| Distribution of LSB | Distribution of LSB | Probability of no signal transition | Probability of signal transition |
| 1 (50%) 0 (50%) | 1 (50%) 0 (50%) | $\frac{1}{2} \times \frac{1}{2} + \frac{1}{2} \times \frac{1}{2} = \frac{1}{2}$ | $\frac{1}{2} \times \frac{1}{2} + \frac{1}{2} \times \frac{1}{2} = \frac{1}{2}$ |

As shown above, due to LSB's value being randomly distributed, the converted sequence has relatively less impact on LSB's activity factor. However, the converted sequence may reduce MSB's activity factor approximately from ½ to ⅜ in every two sample neighbors. Thus about 12.5% signal activity factors between each sample may be reduced, according to certain embodiments.

For example, in an audio link configuration, which is typically a serial link, a data stream may be received from a parallel bus and needs to be converted into a serial data stream prior transmitting onto the serial link. Typically, a parallel-to-serial converter may be utilized to convert the data stream in parallel to a serial data stream.

Figure 3:
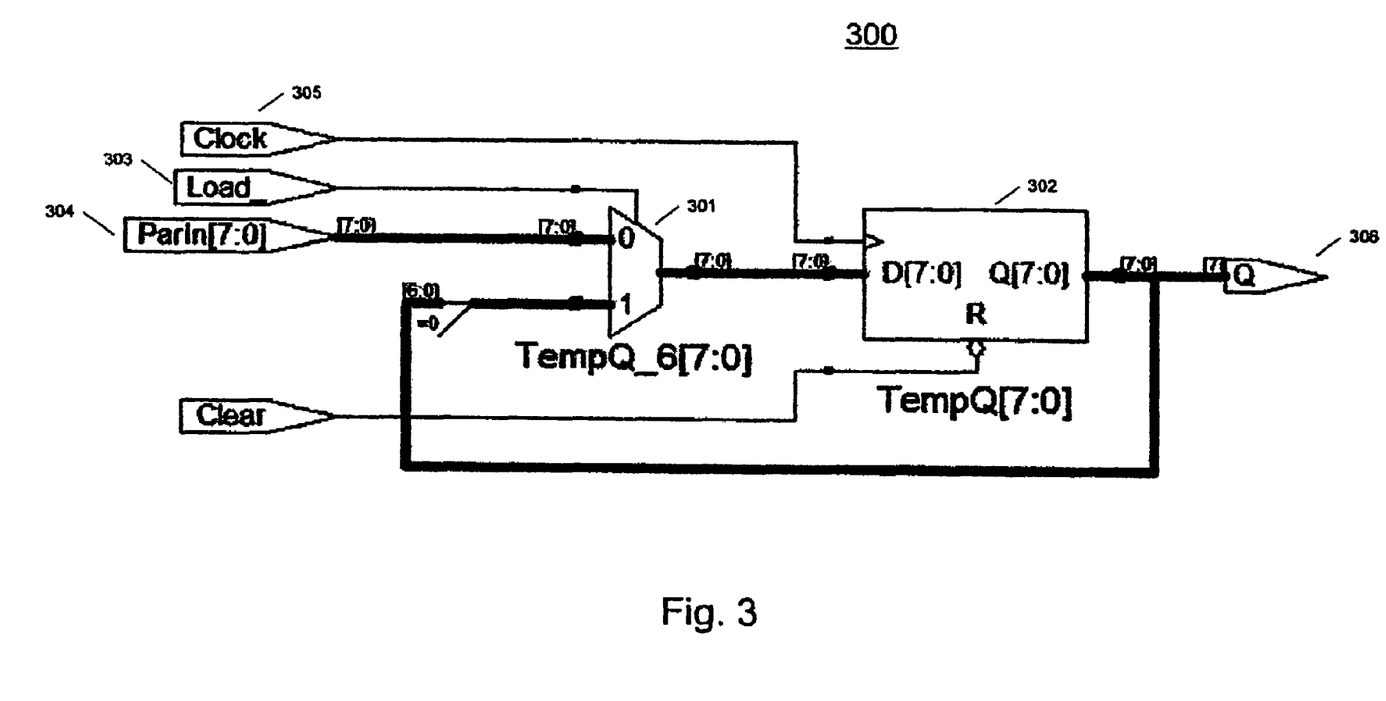
FIG. 3 is a block diagram illustrating a parallel-to-serial converter.

FIG. 3 is a parallel-to-serial converter used in a conventional audio link interface circuit. Referring to FIG. 3, device 300 includes a latch circuit 301 and a shifter circuit 302. When the input data stream 304 is received in parallel, once the load signal 303 is asserted, the latch circuit 301 latches the input data stream 304. Thereafter, for every clock cycle of the clock signal 305 received, the shifter circuit 302 converts, via shifting operations, the latched parallel data stream into a serial data stream 306 to be transmitted onto a serial link. Normally, a data segment is shifted from LSB to MSB in this arrangement.

Figure 4:
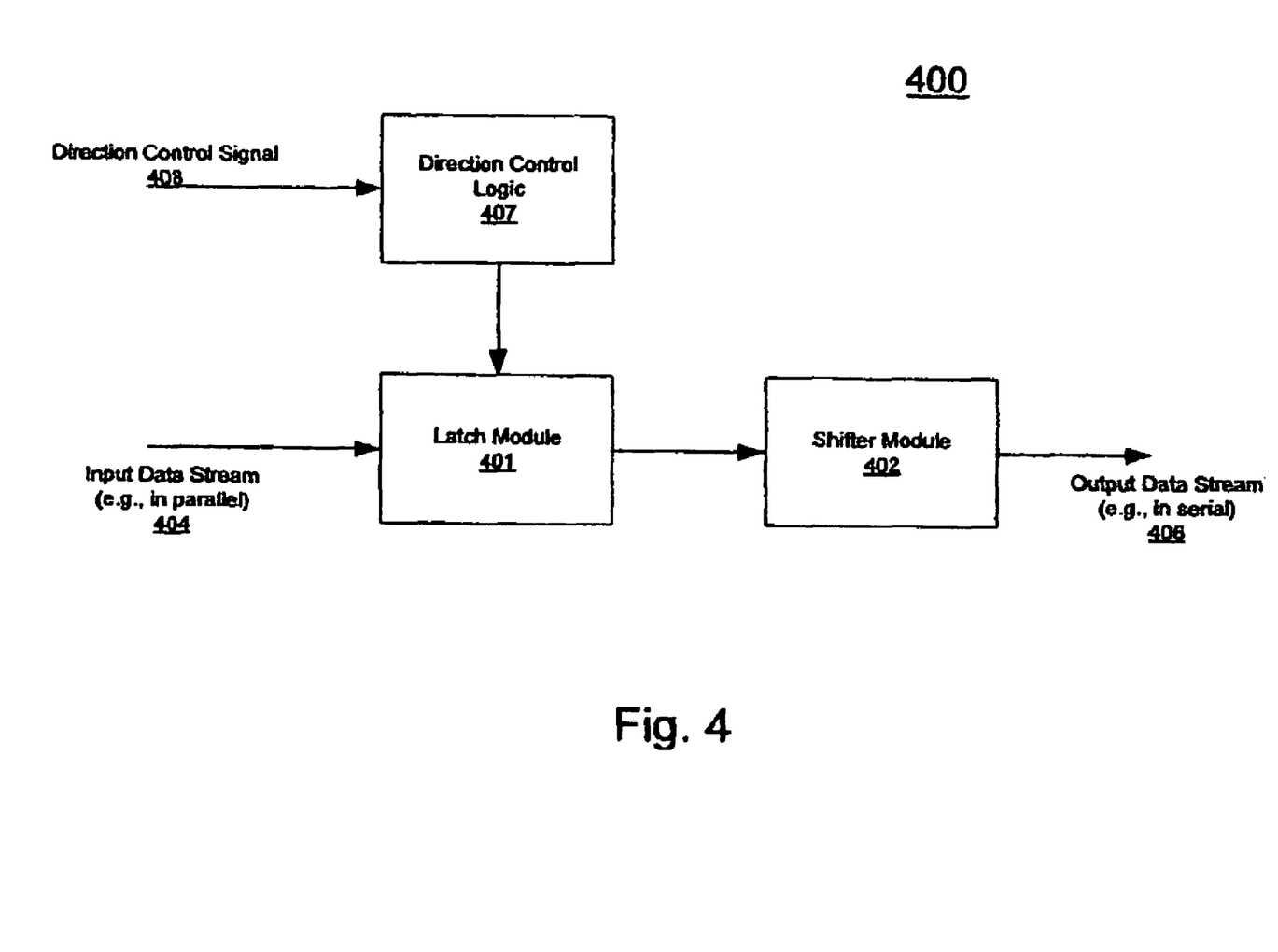
FIG. 4 is a block diagram illustrating an example of an encoder according to one embodiment.

According to one embodiment, direction control logic is utilized in a parallel-to-serial converter that shifts a data segment from LSB to MSB or vice versa. FIG. 4 is a block diagram illustrating an example of a parallel-to-serial converter according to one embodiment Note that device example 400 may be implemented in hardware, software, or a combination of both.

Referring to FIG. 4, similar to device 300 of FIG. 3, device 400 includes a latch circuit 401 and a shifter circuit 402. When the input data stream 404 is received in parallel, the latch circuit 401 latches the input data stream 404. Thereafter, for every clock cycle, the shifter circuit 402 converts, via shifting operations, the latched parallel data stream into a serial data stream 406 to be transmitted onto a serial link.

In addition, device 400 further includes direction control logic 407 coupled to the latch circuit 401 to control a direction of bits of the latched data to be shifted by shifter module 402, in response to a direction control signal 408. The direction control signal 408 may be generated based on one or more activity factors of the data stream 404, which may be determined at real time. As a result, a data stream may be shifted from LSB to MSB or vice versa.

In one embodiment, since for serial bus, there is already a shifter (e.g., single direction, left or right) for audio sample parallel to serial conversion, a left and right direction controlled logic may be added to the shifter. To identify which samples transmission sequence has been converted, for example, after reset, the first sample is non-converted; the second is converted, and then follow this pattern.

Figure 5:
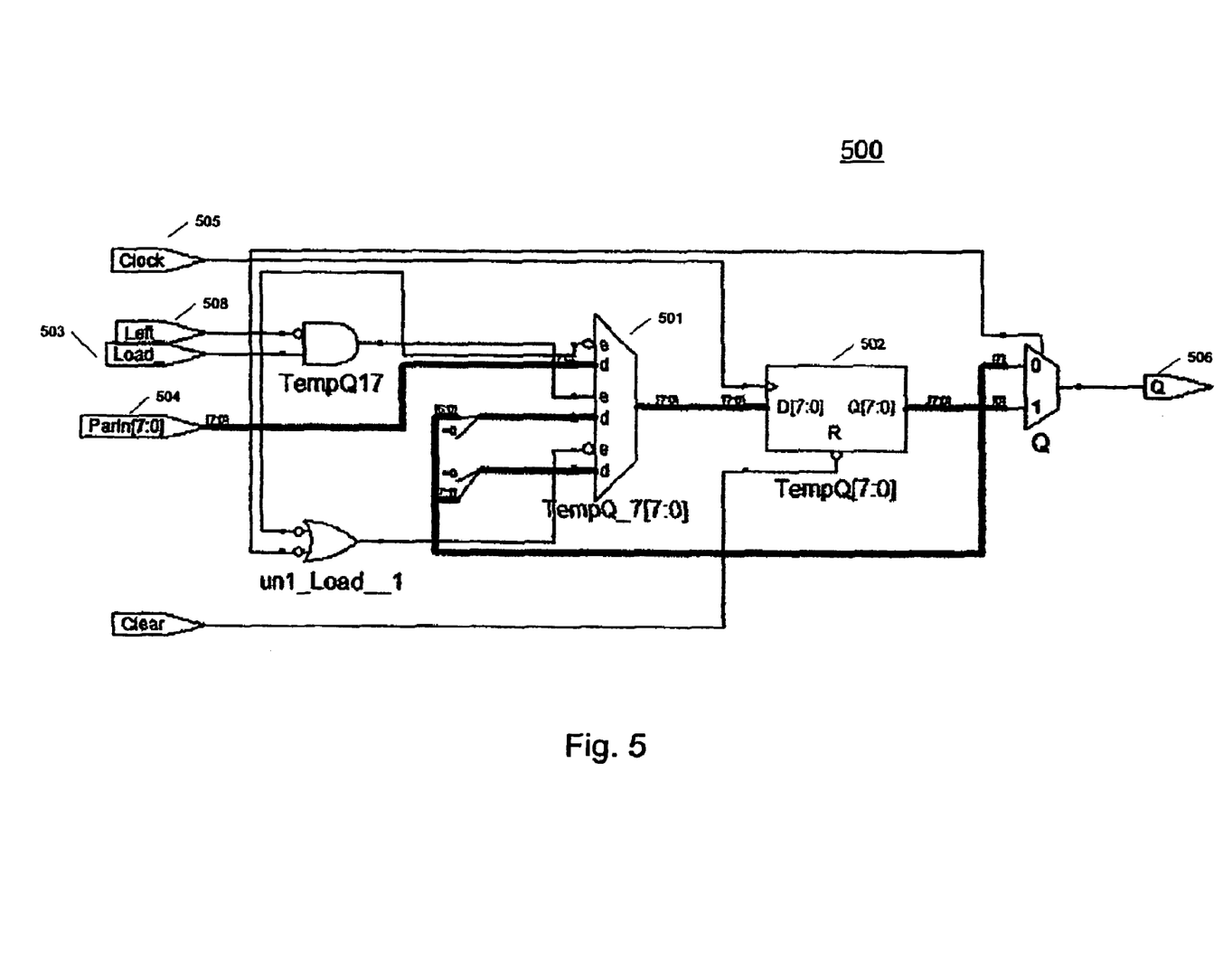
FIG. 5 is a block diagram illustrating an example of an encoder according to another embodiment.

FIG. 5 is a block diagram illustrating an example of a parallel-to-serial converter according to another embodiment. For example, device 500 may be implemented as a part of device 400 of FIG. 4. In this example, a data stream having an 8-bit data width is used for purposes of illustration. Referring to FIG. 5, device 500 includes, but is not limited to, a latch circuit 501 and a shifter circuit 502. When the input data stream 504 is received in parallel, once the load signal 503 is asserted, the latch circuit 501 latches the input data stream 504. Thereafter, for every clock cycle of the clock signal 505 received, the shifter circuit 502 converts, via shifting operations, the latched parallel data stream into a serial data stream 506 to be transmitted onto a serial link. In one embodiment, the shifter circuit 502 may shift the latched data from left to right or vice versa, dependent upon an output of direction control logic 507 in response to a direction control signal 508. The direction control signal 508 may be determined based on one or more activity factors of the latched data. Other components may also be included.

Due to the shifter and added direction controlling logics are inside the chip, it is estimated the additional core logic's power consumption. In certain embodiments, the direction controlling core logic for the shifter may consume approximately 2.57 µW of power. For equivalent capability, FPGA will consume about 20 times of power as that of ASIC. Thus the power consumption of additional logics inside the chips is about 0.1285 µW.

For audio samples transmitted in normal original sequence, the signal transition percentage of MSB and LSB may be about 50%. The I/O pin capacitance of SDIN is about 7.5 pF, with the clock speed of 24 MHz, the $V_{dd}$ being 3.3V, the $p_{t_1}$ being 50%, the power consumption of the two I/O pins signal transition under normal original sequence may be determined as follows.

$$P_{chip} \propto \sum_{i=1}^{N} C_{loadi} \cdot V_{dd}^2 \cdot f \cdot p_{t_1} \propto$$

$$\sum_{i=1}^{2} 7.5 \text{ pF} \cdot 3.3^2 \cdot \left(24 \text{ MHz} \times \frac{1}{8}\right) \cdot 0.5 = 245 \text{ µW}$$

With the converted coding transmission sequence, approximately 12.5% of the MSB and LSB's transition may be reduced, thus 245 µW×12.5%=30.6 µW I/O power consumption may be reduced only at the expense of inner additional control logics of approximately 0.1285 µW power consumption, which may be neglected compared with the power consumption reduced.

Figure 6:
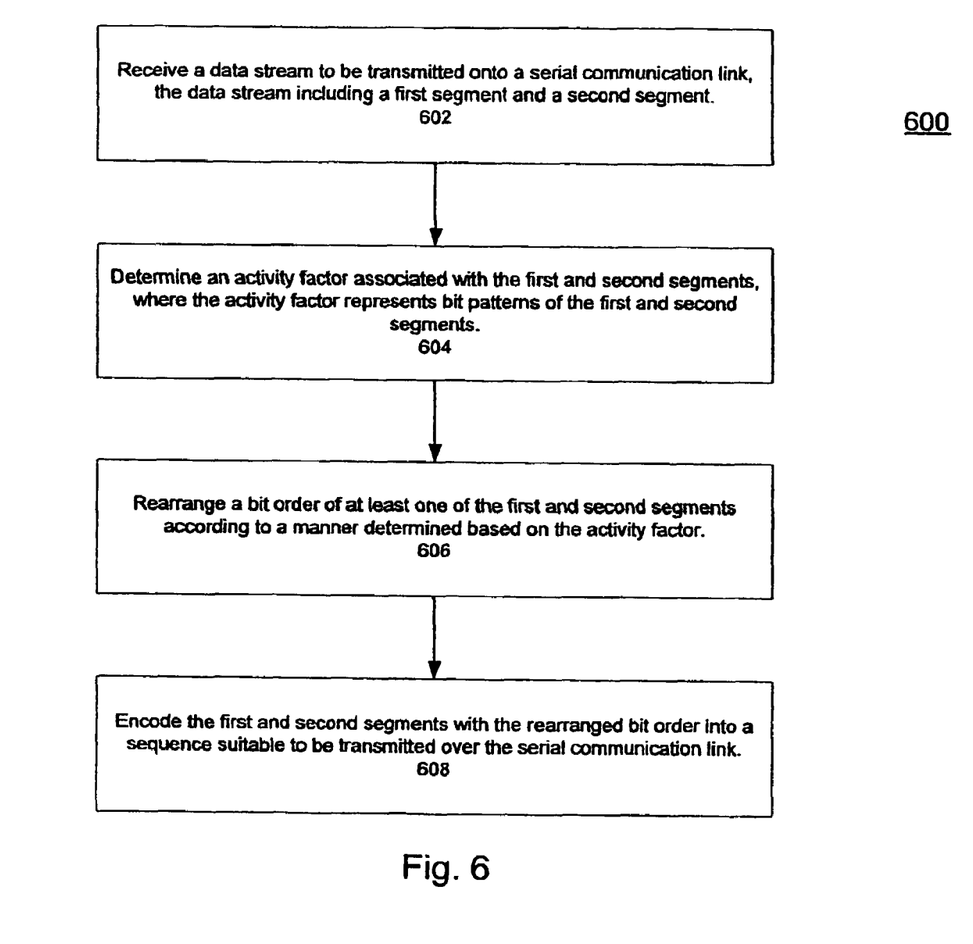
FIG. 6 is a flow diagram illustrating an example of a process for encoding data stream according to one embodiment.

FIG. 6 is a flow diagram illustrating an example of a process for encoding data according to one embodiment. Process 600 may be performed by a processing logic that may include hardware (circuitry, dedicated logic, etc.), software (such as is run on a general purpose computer system or a dedicated machine), or a combination of both. For example, process example 600 may be performed by devices 400 of FIG. 4 and/or 500 of FIG. 5.

In one embodiment, process 600 includes, but is not limited to, in response to a data stream to be transmitted onto a serial communication link, encoding one or more bits of the data stream according to a bit order determined based on a frequency of signal transitions of the data stream, forming a sequence of an encoded data stream having a lower number of bit transitions with respect to the frequency of signal transitions of the data stream prior to the encoding via reordering of the bits in the data stream, and transmitting the encoded data sequence onto the serial communication link.

Referring to FIG. 6, processing logic receives a data stream to be transmitted over serial link, where the data stream includes a first segment and a second segment (block 602). The data stream may be part of an audio data stream, for example, received over a parallel bus. The data stream may be in a variety of format or data width according to certain embodiments, such as, for example, 8-bit, 16-bit, or 32-bit data width, etc. In response to the data stream, processing logic determines one or more activity factors of the data stream, for example, with respect to the first and second segments (block 604). An activity factor may represent bit patterns of the first and second segments (e.g., transitions from logical value of "0" to "1", or vice versa). An activity factor may be determined at real time. Alternatively, an activity factor may be embedded within the data stream, such as, for example, metadata associated with the data stream.

Processing logic rearranges the bit order of at least one of the first and second segments according to a manner determined based on the activity factor or factors (block 606). In one embodiment, the bit order of at least one of the first and second segments may be performed using one or more techniques described above. For example, a first or a second sample may be inverted prior to serializing them, such that a number of consecutive bits having identical logical values may be increased to reduce an activity factor (e.g., a number of transitions between logical values of "0" and "1", or vice versa). Thereafter, the arranged bit order of the first and second segments are encoded forming a sequence of data steam suitable to be transmitted onto a serial link (block 608). Other operations may also be included.

Figure 7:
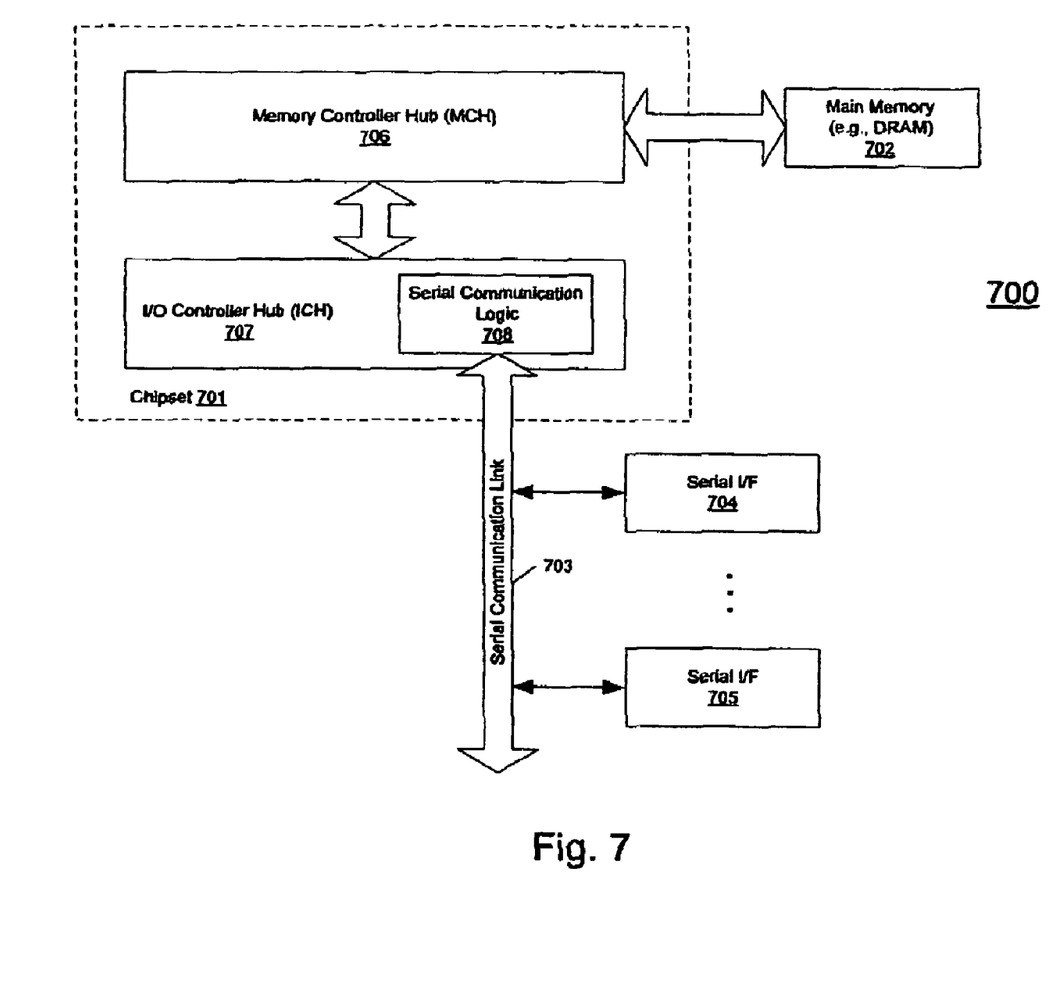
FIG. 7 is a block diagram illustrating an example of a device for encoding data stream according to one embodiment.

FIG. 7 is a block diagram illustrating an example of system configuration which may be used one or more techniques described above according to one embodiment. For example, system 700 may be implemented as a part of a data processing system having device 400 and/or device 500 of FIG. 4 and/or FIG. 5. System 700 may perform one or more of the operations of process 600 of FIG. 6.

Referring to FIG. 7, system 700 includes, but is not limited to, a chipset 701 having a memory controller hub (MCH) 706 and an IO (input/output) controller hub (ICH) 707. MCH 706 may be coupled to a main memory, which may be a DRAM (dynamic random-access memory), or the like. ICH 707 may include serial communication logic 708, which may include some or all of device 400 if FIG. 4 and/or device 500 of FIG. 5. In one embodiment, the serial communication logic 708 may be coupled to one or more serial communication interface devices 704-705 via a serial communication link 703, which may be a bus or an interconnect dependent upon communication protocols, etc. In on embodiment, the serial communication logic may perform some or all of the operations of process 600 of FIG. 6.

In one embodiment, chipset 701 includes, but is not limited to, an input/output (I/O) circuit having an associated encoder to encode one or more bits of the data stream according to a bit order determined based on a frequency of signal transitions of a data stream, in response to the data stream to be transmitted onto a serial communication link. The encoder is configured to form a sequence of encoded data stream having a lower number of bit transitions with respect to the frequency of signal transitions of the data stream prior to the encoding via reordering of the bits in the data stream. The device further includes a serial communication interface coupled to the encoder to transmit the encoded data sequence onto the serial communication link. Other configurations may exist.

Figure 8:
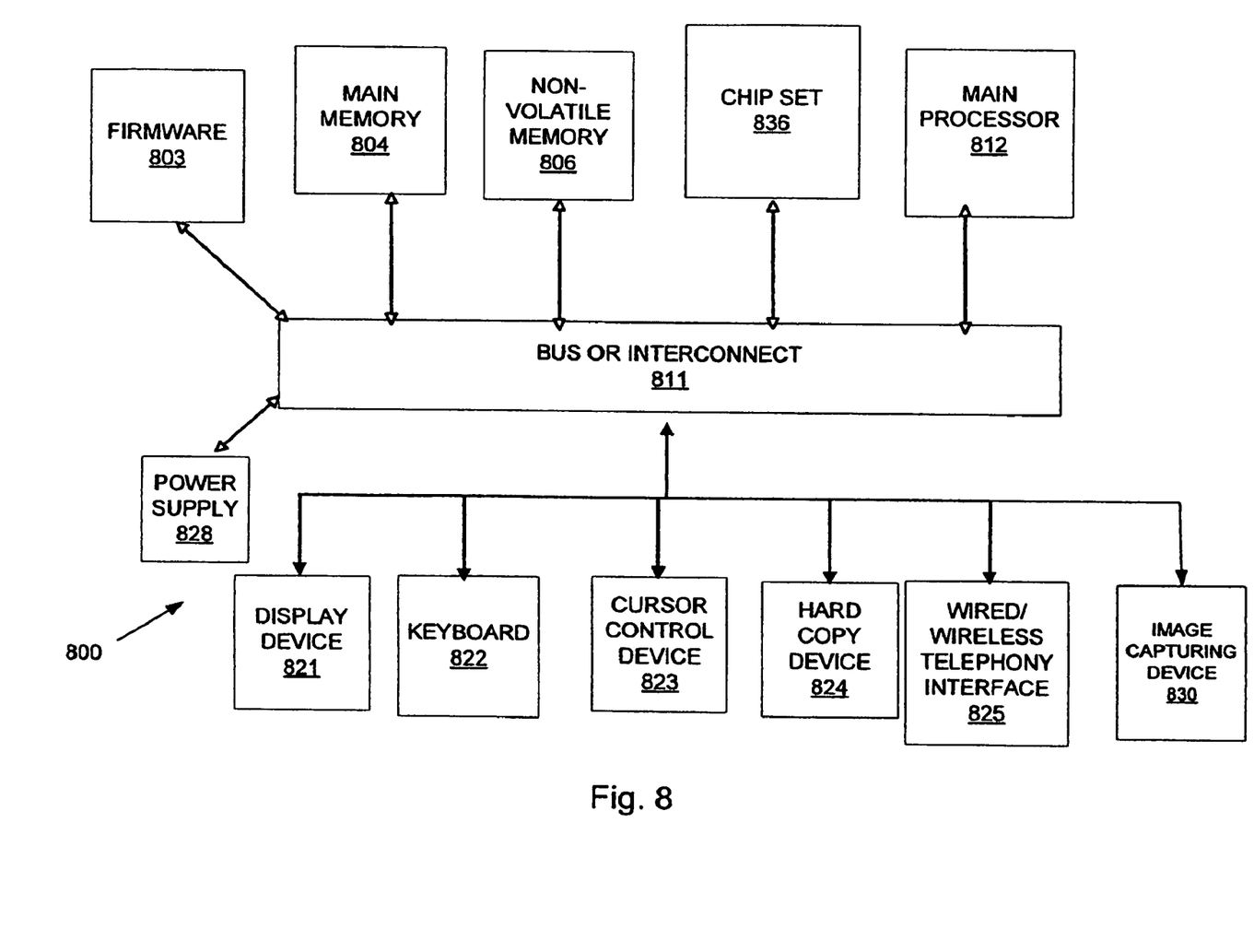
FIG. 8 is a block diagram of a data processing system which may be used with an embodiment.

FIG. 8 is a block diagram of an example computer system that may use an embodiment having at least one of the features described above. In one embodiment, computer system 800 includes a communication mechanism, bus, or interconnect 811 for communicating information, and an integrated circuit component such as a main processing unit 812 coupled with bus 811 for processing information. One or more of the components or devices in the computer system 800 such as the main processing unit 812 or a chip set 836 may use an embodiment of the techniques described above. The main processing unit 812 may consist of one or more processors or processor cores working together as a unit.

Computer system 800 further includes a random access memory (RAM) or other dynamic storage device 804 (also referred to as a main memory) coupled to bus 811 for storing information and instructions to be executed by main processing unit 812. Main memory 804 may also be used for storing temporary variables or other intermediate information during execution of instructions by main processing unit 812.

Firmware 803 may be a combination of software and hardware, such as Electronically Programmable Read-Only Memory (EPROM) that has the operations for the routine recorded on the EPROM. The firmware 803 may embed foundation code, basic input/output system code (BIOS), or other similar code. The firmware 803 may make it possible for the computer system 800 to boot itself.

Computer system 800 may also include a read-only memory (ROM) and/or other static storage device 806 coupled to bus or interconnect 811 for storing static information and instructions for main processing unit 812. The static storage device 806 may store OS level and application level software. Computer system 800 may further be coupled to a display device 821, such as a cathode ray tube (CRT) or liquid crystal display (LCD), coupled to bus 811 for displaying information to a computer user. A chipset may interface with the display device 821.

An alphanumeric input device (keyboard) 822, including alphanumeric and other keys, may also be coupled to bus 811 for communicating information and command selections to main processing unit 812. An additional user input device is cursor control device 823, such as a mouse, trackball, trackpad, stylus, or cursor direction keys, coupled to bus 811 for communicating direction information and command selections to main processing unit 812, and for controlling cursor movement on a display device 821. A chipset may interface with the input output devices.

Another device that may be coupled to bus 811 is a hard copy device 824, which may be used for printing instructions, data, or other information on a medium such as paper, film, or similar types of media. Furthermore, a sound recording and playback device, such as a speaker and/or microphone (not shown) may optionally be coupled to bus 811 for audio interfacing with computer system 800. Another device that may be coupled to bus 811 is a wired/wireless communication capability 825.

According to one embodiment, chipset 836 may include some or all of the device 400 of FIG. 4 and/or device 500 of FIG. 5, which may performed one or more operations involved in process 600 of FIG. 6. Other components may also be included.

Thus, signal transition feature based coding for serial link has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method, comprising:
   in response to a data stream to be transmitted onto a serial communication link, encoding one or more bits of the data stream according to a bit order determined based on a frequency of signal transitions of the data stream;
   forming a sequence in an encoded data stream having a lower number of bit transitions with respect to the frequency of signal transitions of the data stream prior to the encoding via reordering of the bits in the data stream; and
   transmitting the encoded data sequence onto the serial communication link.

2. The method of claim 1, further comprising determining one or more activity factors of the data stream, wherein encoding one or more bits of the data stream is performed to reduce one or more values of the one or more activity factors.

3. The method of claim 1, wherein encoding one or more bits of the data stream comprises rearranging one or more bits of the data stream to increase a number of consecutive bits that have an identical logical value.

4. The method of claim 3, wherein the data stream comprises a first segment and a second segment, and wherein encoding one or more bits of the data stream comprises:
   encoding one or more bits of at least one of the first and second segments to increase the number of consecutive bits that have the identical logical value within the first and second segments; and
   serializing the encoded at least one of the first and second segments to generate a sequence of bits representing the first and second segments as a part of the encoded data sequence suitable to be transmitted onto the serial link.

5. The method of claim 4, further comprising:
   encoding bits of the first segment in a first bit order;
   encoding bits of the second segment in a second bit order different than the first bit order; and
   serializing the encoded first and second segments to form the sequence of bits representing the first and second segments.

6. The method of claim 5, wherein the first segment is encoded from LSB (least significant bit) to MSB (most significant bit), and wherein the second segment is encoded from MSB to LSB.

7. The method of claim 5, wherein the data stream is received from a parallel bus, and wherein encoding one or more bits of the data stream comprises converting the data stream from a first format suitable for the parallel bus into a second format suitable for the serial communication link.

8. The method of claim 7, wherein converting the data stream from the first format to the second format is performed by a parallel-to-serial converter within a chipset of a data processing system.

9. The method of claim 8, wherein the parallel-to-serial converter comprises direction control logic to control whether a segment of the data stream is encoded according to one of the first and second bit orders.

10. The method of claim 1, wherein the data stream comprises audio data and wherein the serial communication link comprises an audio link.

11. An apparatus, comprising:
   an input/output (I/O) circuit having an associated encoder to encode one or more bits of the data stream according to a bit order determined based on a frequency of signal transitions of a data stream, in response to the data stream to be transmitted onto a serial communication link, wherein the encoder to form a sequence of encoded data stream having a lower number of bit transitions with respect to the frequency of signal transitions of the data stream prior to the encoding via reordering of the bits in the data stream; and
   a serial communication interface coupled to the encoder to transmit the encoded data sequence onto the serial communication link.

12. The apparatus of claim 11, wherein the encoder is configured to
   determine one or more activity factors of the data stream, and
   rearrange one or more bits of the data stream to increase a number of consecutive bits that have an identical logical value based on the determined one or more activity factors.

13. The apparatus of claim 12, wherein the data stream comprises a first segment and a second segment, and wherein the encoder is further configured to
   encode bits of the first segment in a first bit order,
   encode bits of the second segment in a second bit order different than the first bit order, and
   serialize the encoded first and second segments to form the sequence of bits representing the first and second segments.

14. The apparatus of claim 13, wherein the encoder comprises direction control logic to control whether at least one of the first and second segments should be encoded according to one of the first and second bit orders.

15. A machine-readable medium for storing instructions, when executed by a machine, cause the machine to perform a method, the method comprising:
   in response to a data stream to be transmitted onto a serial communication link, encoding one or more bits of the data stream according to a bit order determined based on a frequency of signal transitions of the data stream;
   forming a sequence in an encoded data stream having a lower number of bit transitions with respect to the frequency of signal transitions of the data stream prior to the encoding via reordering of the bits in the data stream; and
   transmitting the encoded data sequence onto the serial communication link.

16. The machine-readable medium of claim 15, wherein encoding one or more bits of the data stream comprises rearranging one or more bits of the data stream to increase a number of consecutive bits that have an identical logical value, wherein the data stream comprises a first segment and a second segment, and wherein encoding one or more bits of the data stream comprises:
   encoding one or more bits of at least one of the first and second segments to increase the number of consecutive bits have an identical logical value within the first and second segments; and
   serializing the encoded at least one of the first and second segments to generate a sequence of bits representing the first and second segments suitable to be transmitted onto the serial link.

17. The machine-readable medium of claim 15, wherein the method further comprises:
   encoding bits of the first segment in a first bit order;
   encoding bits of the second segment in a second bit order different than the first bit order; and
   serializing the encoded first and second segments to form the sequence of bits representing the first and second segments.

18. A data processing system, comprising:

a processor; and a chipset coupled to the processor, the chipset including an input/output (I/O) circuit having an associated encoder to encode one or more bits of the data stream according to a bit order determined based on a frequency of signal transitions of a data stream, in response to the data stream to be transmitted onto a serial communication link, wherein the encoder to form a sequence of encoded data stream having a lower number of bit transitions with respect to the frequency of signal transitions of the data stream prior to the encoding via reordering of the bits in the data stream, and a serial communication interface coupled to the encoder to transmit the encoded data sequence onto the serial communication link.

19. The system of claim 18, wherein the encoder is configured to determine one or more activity factors of the data stream, and rearrange one or more bits of the data stream to increase a number of consecutive bits have an identical logical value based on the determined one or more activity factors.

20. The system of claim 19, wherein the data stream comprises a first segment and a second segment, and wherein the encoder is further configured to encode bits of the first segment in a first bit order, encode bits of the second segment in a second bit order different than the first bit order, and serialize the encoded first and second segments to form the sequence of bits representing the first and second segments.

* * * * *